United States Patent [19]

Skinner

[11] Patent Number: 4,690,370
[45] Date of Patent: Sep. 1, 1987

[54] RHODIUM COATED MOLD
[75] Inventor: James R. Skinner, Saratoga, Calif.
[73] Assignee: M. U. Engineering & Manufacturing, Inc., Mountain View, Calif.
[21] Appl. No.: 427,717
[22] Filed: Sep. 29, 1982
[51] Int. Cl.$^4$ .............................................. B29C 33/56
[52] U.S. Cl. ........................... 249/114 R; 204/192.15; 249/116; 249/135; 425/808
[58] Field of Search ................... 249/135, 114 R, 116; 264/338, 2.5, 1.3; 425/808, 810; 427/250; 204/192 C

[56]  References Cited
U.S. PATENT DOCUMENTS

| 1,822,451 | 9/1931 | Oestnaes | 249/135 |
| 3,165,786 | 1/1965 | Yagi et al. | 249/135 |
| 3,868,271 | 2/1975 | Poley et al. | 427/250 |
| 4,116,753 | 9/1978 | Tojyo et al. | 249/135 |
| 4,138,086 | 2/1979 | Mizutani et al. | 249/135 |
| 4,140,592 | 2/1979 | Orlando | 204/192 C |
| 4,262,875 | 4/1981 | Nyman et al. | 427/250 |
| 4,357,366 | 11/1982 | Takaoka et al. | 427/250 |

FOREIGN PATENT DOCUMENTS

| 2039755 | 3/1977 | Japan | 249/135 |
| 4025285 | 2/1979 | Japan | 427/250 |

OTHER PUBLICATIONS

Dempsey, J. J., et al, "Low Stress Chromium Film", *IBM Technical Disclosure Bulletin*, vol. 19, No. 9, FEB. 1977.

Primary Examiner—Jay H. Woo
Assistant Examiner—James C. Housel
Attorney, Agent, or Firm—Fliesler, Dubb, Meyer & Lovejoy

[57]  ABSTRACT

A novel coating (34) is provided on a member (24) which may be part of a mold (24). Plastic articles (10) which are made by injection molding within such a mold (24) can have a very smooth surface by replication of the surface coating (34). This allows the production of so-called rigid discs with a plastic core in place of the present day aluminum cores.

5 Claims, 4 Drawing Figures

RHODIUM COATED MOLD

TECHNICAL FIELD

This invention relates to an article having a very smooth surface which is useful as part of a mold for the injection molding of a plastic article as well as to a method of preparing such an article, a method of molding to produce the molded plastic article, and the resulting molded plastic article.

BACKGROUND ART

Molded plastic articles, particularly injection molded plastic articles, can be made with relatively smooth surfaces by providing a relatively smooth surface for the mold in which the article is manufactured. Generally, this is accomplished by machining grinding, and lapping any portion of the mold surface which is to be replicated on a position on the plastic article where smoothness is desired. Unfortunately, it is difficult to attain a surface roughness of no more than about $12.5 \times 10^{-8}$ meters (5 micro inches), RMS (root-mean-square) by such methods. Even more unfortunately, even when a desirably smooth surface is obtained it will generally have a number of voids in it and will generally later develop voids as the surface is exposed to ambient atmospheric conditions. Generally, this occurs through the oxidization or corrosion of the metal surface of the mold. Accordingly, it is difficult or impossible to obtain molded plastic articles of very high smoothness, particularly over long periods of mold operation.

Presently, certain very expensive articles, in particular the so-called rigid discs used in a number of computers, are made by depositing a memory medium such as a magnetic oxide film or forms of metallic platting on a smooth surface of a rigid aluminum disc approximately 0.187 cm thick. The preparation of the disc requires a large number of steps before it can be accepted for coating. Indeed, the surface must be polished or diamond turned to achieve a surface finish of 2.5 to $5 \times 10$ meters, RMS. Accordingly, it would be highly desirable to have a rigid plastic disc with sufficient surface smoothness to accept a magnetic recording medium, which disc could be mass produced at a relatively low price.

The present invention is directed to overcoming one or more of the problems as set forth above.

DISCLOSURE OF THE INVENTION

In one aspect of the present invention, an injection molded plastic article is provided having a surface roughness on at least a portion of one surface thereof of no more than about $12.5 \times 10^{-8}$ meters, RMS.

In accordance with another aspect of the present invention, an improved mold is provided, which mold has a mold surface having a surface portion which is replicated onto a molded plastic article, the surface portion having a surface roughness of no more than about $12.5 \times 10^{-8}$ meters, RMS and including a surface coating covering the surface portion, the coating being substantially void-free, substantially noncorroding when exposed to ambient atmospheric conditions, having a Rockwell C hardness above about 60 and having a surface roughness of no more than about $12.5 \times 10^{-8}$ meters, RMS.

In accordance with yet another embodiment of the present invention, an article is provided which comprises a member having a surface portion having a roughness of no more than about $12.5 \times 10^{-8}$ meters, RMS, covered with a surface coating which is substantially void-free, substantially non-corroding when exposed to ambient atmospheric conditions, has a Rockwell C hardness of about 60 and has a surface roughness of no more than about $12.5 \times 10^{-8}$ meters, RMS.

In accordance with still another aspect of the present invention, a method is provided of producing an article having a surface coating which is substantially void-free, substantially non-corroding when exposed to ambient atmospheric conditions, has a Rockwell C hardness of about 60 and has a surface roughness of no more than about $12.5 \times 10^{-8}$ meters, RMS. The method comprises smoothing a surface portion of the member to have a surface roughness of no more than about $12.5 \times 10^{-8}$ meters, RMS, and sputtering a metal selected from a group consisting of chromium, rhodium and mixtures and intermetallic compounds thereof, onto the aforesaid surface portion.

In accordance with yet another aspect of the present invention, a method is provided of producing a molded plastic article having a very smooth surface portion. The method comprises providing a mold having a mold surface portion which is replicated to form the very smooth surface portion of the plastic article, the mold surface portion being very smooth and being surface-coated with a coating which is substantially void-free, substantially noncorroding when exposed to ambient atmospheric conditions, has a surface roughness of no more than about $12.5 \times 10^{-8}$ meters, RMS, and has a Rockwell C hardness of at least about 60. Plastic is injected into the mold and the plastic is released from the mold after it is hardened.

The improved plastic article made in accordance with the present invention can be advantageously used as a rigid disc base for a magnetic memory medium if the article is properly shaped for such use. It can also be used as an optical recording disc. The article is also useful as a lens if it is transparent and properly shaped for such use. The article of the present invention is useful in any type of molding operation where it is desirable to produce a very smooth surface on the ultimate molded product. It also finds uses in any other areas wherein a smooth, relatively hard, non-corroding metal surface is desired. When operating in accordance with the present invention, a rigid disc can be provided for computer memory use at a fraction of the cost of the prior art aluminum discs.

BEST MODE FOR CARRYING OUT THE INVENTION

Figure 1:
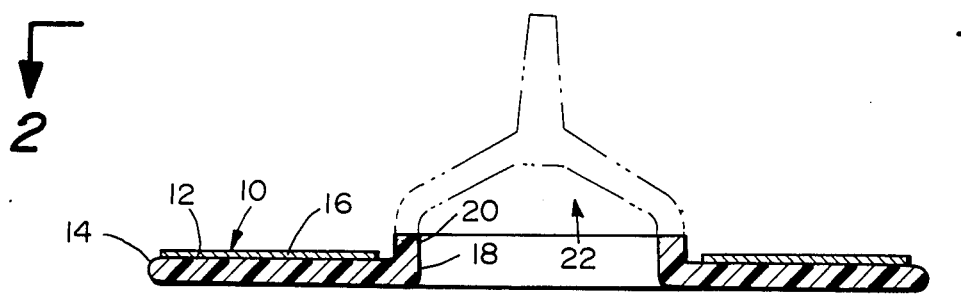
FIG. 1 illustrates, in side elevation view, a rigid injection molded disc of a thermoplastic material having a magnetic media forming a surface layer on a selected portion of its surface.
Figure 2:
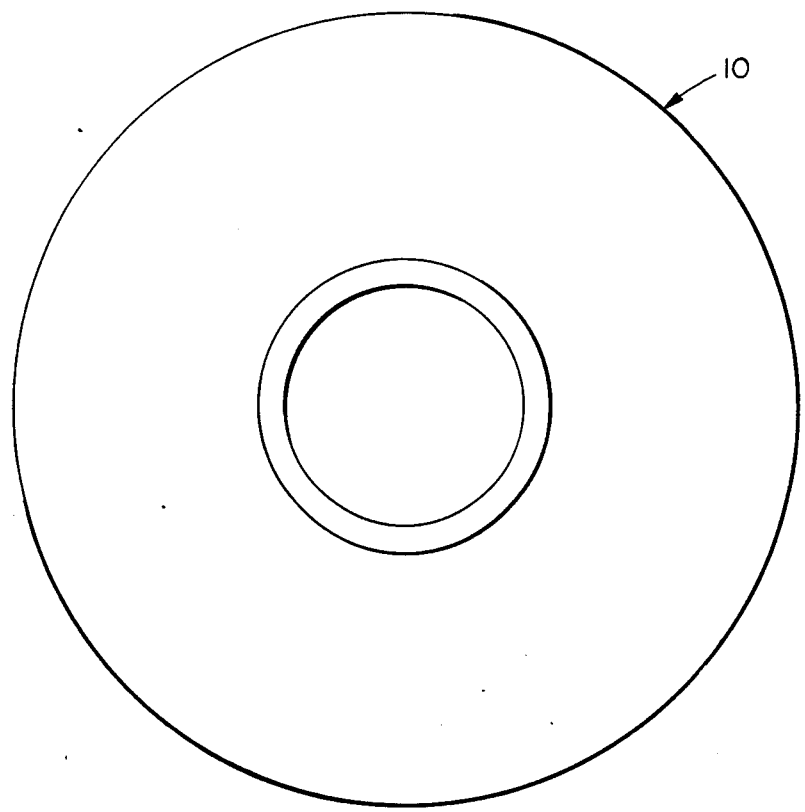
FIG. 2 illustrates a top view of the article of FIG. 1.

Adverting to FIG. 1, a rigid injection molded article 10 of a thermoplastic material is shown. The thermoplastic article 10 has a surface roughness on at least a portion 12 of one surface 14 thereof of no more than about $12.5 \times 10^{-8}$ meters, RMS, more preferably of no more than about $5 \times 10^{-8}$ meters, RMS, and more preferably still of no more than about $2.5 \times 10^{-8}$ meters, RMS. As will be apparent from FIGS. 1 and 2, the article 10 is in the shape of a memory storage disc. A surface layer 16 of a memory recording medium is conventionally applied to and covers at least a part of the portion 12 of the one surface 14. The disc 10 has a centrally located circular orifice 18 and includes a shoulder 20 surrounding the orifice 18 and extending orthogonally in a first direction 22 from the disc 10. The shoulder 20 is optional. When present it allows a plurality of the discs 10 to be stacked, one upon another, separated by the thickness of the shoulder 20.

The entire article 10 can be injection molded in a single operation, thus eliminating the necessity for inserting plastic hubs in present day aluminum based memory recording discs. Central gating (shown in phantom in FIG. 1) eliminates molding flow or weld lines which would interfere with the surface smoothness. Also, central gating ensures balanced flow which translates to optimum thickness uniformity and optimum flatness as a result of uniform shrinkage. Central gating is equally important for optical discs because birefringence can be eliminated with some plastics or reduced to a radial component that is acceptable.

The thermoplastic material is preferably selected from a group consisting of polycarbonate plastics, polyphenylene oxide plastics, polyethylene terephthalate plastics, polybutylene terephthalate plastics, polyphenylene sulfide plastics, polysulfone plastics, polyetherimide plastics, and acrylic plastics. The acrylic plastics are transparent and may be used for discs which are used for the optical storage of data.

There are numerous methods and forms of magnetic media which can serve as the surface layer 16. For example, electroless plateable media may be utilized on plastics that are designed for plating baths. High temperature oxide media may be utilized on high temperature plastics, and thin film vacuum deposited media may be used on low vapor pressure plastics. Filler materials may be used to enhance a polymer's physical properties or to provide a compatible base for the magnetic media. The filler may be glass, mineral or metal to provide strength, stability or stiffness. In one alternate embodiment of the invention, the surface 14 of the disc 10 may be made of a cross-linkable material which is sprayed onto the mold surface of a mold in which the disc 10 is made and into which plastic is then injected to form a laminate. This can provide a smooth surface finish on a filled plastic that would not normally mold smoothly. Additionally, the parts of the mold may be forced together hydraulically to reduce shrinkage of the article 10 away from the surface of the mold cavity and to provide post packing force of the plastic article.

Figure 4:
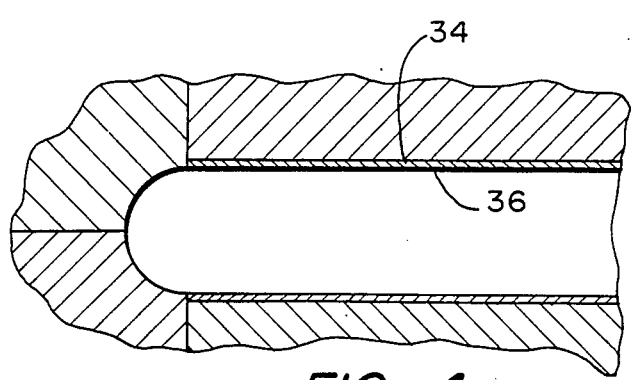
FIG. 4 illustrates, in enlarged view, a portion of FIG. 3.
Figure 3:
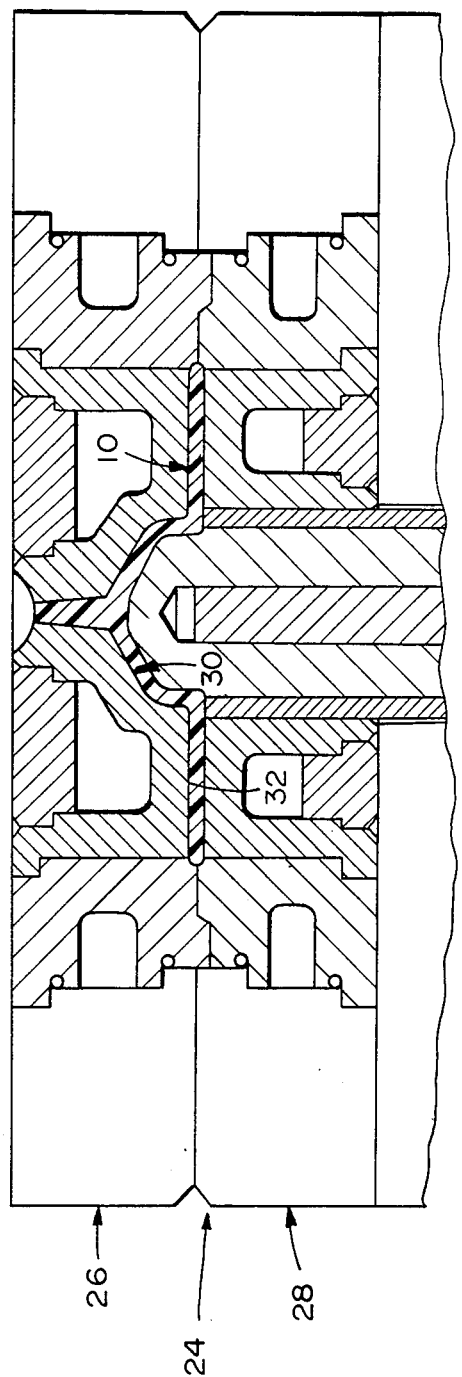
FIG. 3 illustrates an improved mold, in side section view, in accordance with an embodiment of the present invention.

Adverting now primarily to FIG. 3, a mold 24 is seen which includes a first mold half 26 and a second mold half 28. The mold 24 is useful for preparing the molded plastic article 10 shown in FIGS. 1 and 2. The mold 24 has a mold surface 30 having a surface portion 32 which is replicated onto the molded plastic article 10. The surface portion 32 of the mold 24 is provided with a surface roughness of no more than about $12.5 \times 10^{-8}$ meters, RMS. It includes a surface coating 34, seen in FIG. 4, which covers the surface portion 32 of the mold 24. The surface coating 34 is substantially void-free, substantially non-corroding when exposed to ambient atmospheric conditions for extended periods of time, for example for several weeks or months, which has a Rockwell C hardness above about 60 and which has a surface roughness at a surface 36 thereof of no more than about $12.5 \times 10^{-8}$ meters, RMS. The coating 34 is of a metal selected from a group consisting of chromium, rhodium and mixtures and intermetallic compounds thereof and is generally of a thickness of from about 100 angstroms to about 12,000 angstroms. Preferably, the surface coating 34 is about 4000 angstroms thick. The coating 34 is provided by vacuum deposition upon the surface portion 32 of the molded plastic article 10. Preferably, the coating 34 is provided on the surface portion 32 of the mold 24. The resulting coated mold 24 has the necessary degree of smoothness, void-free character, non-corroding character, Rockwell C hardness, etc. Thus, the mold 24 constitutes a member having the surface portion 32 thereof of the desired degree of smoothness and being covered with the surface coating 34 of the desired nature.

In accordance with the method of the present invention, the mold 24 is an article which is provided with the surface coating 34 which is substantially void-free, substantially noncorroding when exposed to ambient atmospheric conditions, has a Rockwell C hardness above about 60 and has a surface roughness of no more than about $12.5 \times 10^{-8}$ meters, RMS. It is provided by smoothing the surface portion 32 of the mold 24 until it has a roughness of no more than about $12.5 \times 10^{-8}$ meters, RMS, and then sputtering chromium, rhodium, or mixtures and intermetallic compounds thereof onto the surface portion 32.

In accordance with the method of producing the molded plastic article 10 of the present invention, which molded plastic article has a very smooth surface portion 12, one provides a mold 24 having a mold surface portion 32 which is replicated to form the very smooth surface portion 12 of the plastic article 10. The mold surface portion 32 is very smooth and is surface coated with a coating 34 which is substantially void-free, substantially non-corroding when exposed to ambient atmospheric conditions, has a surface roughness of no more than about $12.5 \times 10^{-8}$ meters, RMS, and has a Rockwell C hardness of at least about 60. Plastic is injected into the mold 24 and the plastic is released from the mold 24 after it has hardened. The surface coating 34 is as set out above and is preferably provided by sputtering. Preferably, the pressure within the mold cavity is monitored during the molding process.

INDUSTRIAL APPLICABILITY

The present invention provides a novel coated article which can be used as a mold for the injection molding of thermoplastic materials. The thermoplastic materials are themselves novel because of their very smooth surfaces. The invention also provides a novel method of making the coated article and of making the plastic article. For operating in accordance with the present invention one may produce such articles as hard discs for storing information, via deposition of a layer of a magnetic medium. The production costs for such hard discs are far below those for present day aluminum based hard discs.

Other aspects, objectives, and advantages of this invention can be obtained from a study of the drawing, the disclosure and the appended claims.

I claim:

1. In a mold (24) useful for preparing a molded plastic article (10), the mold (24) having a mold surface (30)

having a surface portion (32) which is replicated onto the molded plastic article (10), an improvement comprising:

wherein said surface portion (32) has a surface roughness of no more than about $12.5 \times 10^{-8}$ meters, RMS; and including a surface coating (34) comprising rhodium covering said surface portion (32), said coating (34) being substantially void-free, substantially noncorroding when exposed to ambient atmospheric conditions, having a Rockwell C hardness above about 60 and having a surface roughness of no more than about $12.5 \times 10^{-8}$ meters, RMS.

2. An improved mold (24) as set forth in claim 1, wherein said coating (34) is provided by vacuum deposition.

3. An improved mold (24) as set forth in claim 2, wherein said coating (34) is provided by sputtering.

4. An article (24), comprising:

a surface (30) having a surface portion (32) having a roughness of no more than about $12.5 \times 10^{-8}$ meters, RMS, and having a surface coating (34) comprising rhodium which is substantially void-free, substantially non-corroding when exposed to ambient atmospheric conditions, has a Rockwell C hardness above about 60, and has a surface roughness of no more than about $12.5 \times 10^{-8}$ meters, RMS.

5. An article (24) as set forth in claim 4, wherein said coating (34) is provided by sputtering.

* * * * *